United States Patent
Shenoy

(10) Patent No.: US 10,033,276 B2
(45) Date of Patent: Jul. 24, 2018

(54) CURRENT SENSING USING CAPACITOR VOLTAGE RIPPLE IN HYBRID CAPACITOR/INDUCTOR POWER CONVERTERS

(71) Applicant: Texas Instruments Incorporated, Dallas, TX (US)

(72) Inventor: Pradeep S. Shenoy, Richardson, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 15/060,389

(22) Filed: Mar. 3, 2016

(65) Prior Publication Data

US 2016/0261190 A1 Sep. 8, 2016

Related U.S. Application Data

(60) Provisional application No. 62/129,269, filed on Mar. 6, 2015.

(51) Int. Cl.
*H02M 3/158* (2006.01)
*H02M 1/14* (2006.01)
*H02M 1/00* (2006.01)

(52) U.S. Cl.
CPC ............ *H02M 3/158* (2013.01); *H02M 1/14* (2013.01); *H02M 3/1584* (2013.01); *H02M 2001/0009* (2013.01); *H02M 2003/1586* (2013.01)

(58) Field of Classification Search
CPC ...... H02M 3/158; H02M 1/14; H02M 3/1584; H02M 2001/0009; H02M 2003/1586; H02M 2003/072
See application file for complete search history.

(56) References Cited

U.S. PATENT DOCUMENTS

| | | | |
|---|---|---|---|
| 9,300,210 B1 * | 3/2016 | Lidsky | H02M 3/156 |
| 2015/0207400 A1 * | 7/2015 | Shenoy | H02M 3/1584 323/213 |
| 2015/0311792 A1 * | 10/2015 | Amaro | H02M 1/08 323/271 |

(Continued)

OTHER PUBLICATIONS

Shenoy, Pradeep S.; Amaro, Mike; Freeman, Dave; Morroni, Jeff; "Comparison of a 12V, 10A, 3MHz Buck Converter and a Series Capacitor Buck Converter," Kilby Labs, Texas Instruments, Dallas, Texas, USA, 8 pages.

(Continued)

*Primary Examiner* — Jue Zhang
*Assistant Examiner* — Lakaisha Jackson
(74) *Attorney, Agent, or Firm* — Michael A. Davis, Jr.; Charles A. Brill; Frank D. Cimino

(57) ABSTRACT

A DC-to-DC power converter includes a power stage, an output stage and a ripple magnitude detector. The power stage includes a plurality of transistors, an energy transfer capacitor coupled between at least two of the transistors, and a switch node. The output stage includes an inductor coupled between switch node and a voltage output. The ripple magnitude detector detects a magnitude of a change in voltage across the energy transfer capacitor and determines an amount of current though the inductor based on the magnitude of the change in voltage across the energy transfer capacitor.

20 Claims, 3 Drawing Sheets

(56) References Cited

U.S. PATENT DOCUMENTS

2015/0311793 A1* 10/2015 Khayat ................ H02M 3/158
                                                      323/271
2016/0118886 A1*  4/2016 Zhang ................. H02M 3/158
                                                      323/271

OTHER PUBLICATIONS

Yousefzadeh, Vahid; Alarcon, Eduard; Maksimovic, Dragan; "Three-Level Buck Converter for Envelope Tracking Applications," IEEE Transactions on Power Electronics, vol. 21, No. 2, Mar. 2006, pp. 549-552.
Reusch, David; Lee, Fred C.; Xu, Ming, "Three Level Buck Converter with Control and Soft Startup," 2009 IEEE, pp. 31-35.
Shenoy, Pradeep S.; Lazaro, Orlando; Amaro, Mike; Ramani, Ramanathan; Wiktor, Wlodek; Lynch, Brian; Khayat, Joseph; "Automatic Current Sharing Mechanism in the Series Capacitor Buck Converter," 2015 IEEE, 7 pages.

* cited by examiner

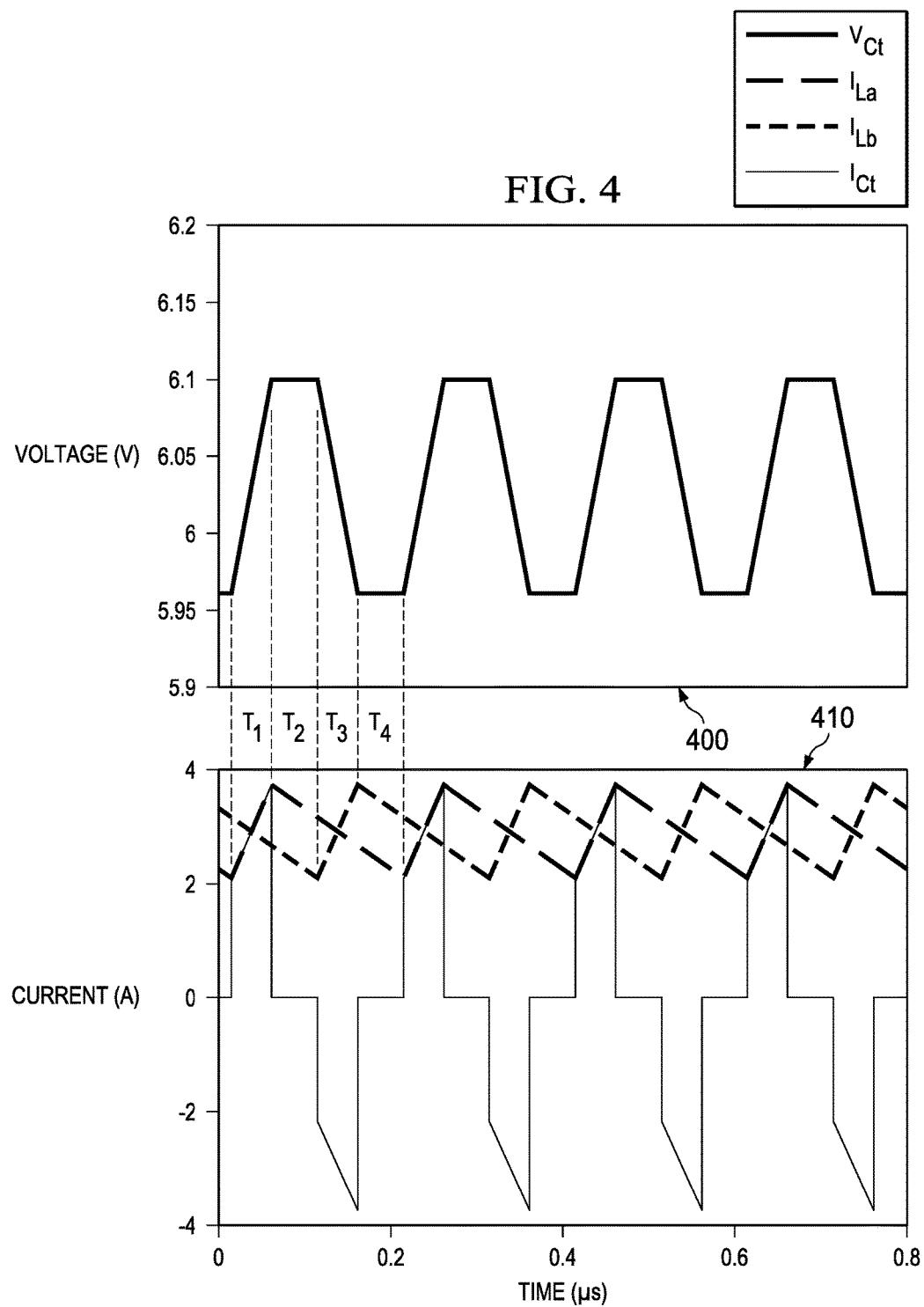

CURRENT SENSING USING CAPACITOR VOLTAGE RIPPLE IN HYBRID CAPACITOR/INDUCTOR POWER CONVERTERS

BACKGROUND

The increasing demand of integrating electronic devices onto automotive, industrial, and consumer platforms requires more sophisticated power conversion and distribution designs. Often these electronic devices include embedded processors, memories, and other electronic components that are operated from one battery source. DC-to-DC power converters are used to supply different voltages to the different electronic components.

A step-down converter is a DC-to-DC power converter that steps an input voltage down to a lower voltage. A buck converter is one example of a step-down converter topology wherein the current in an inductor is controlled by one or more switches (usually transistors). In certain step-down converter topologies, including certain buck converters, a switched capacitor (SC) circuit is merged with an inductor-based converter. Thus, such hybrid capacitor/inductor DC-to-DC converters contain at least one energy transfer capacitor. This can be the flying capacitor in a three level buck converter or the series capacitor in a series capacitor buck converter. In such hybrid capacitor/inductor converters, voltage conversion is accomplished by the switched capacitor circuit and output regulation is achieved through the buck stage. This division of labor plays to the strengths of each circuit.

A multi-phase DC-to-DC converter consists of multiple DC-to-DC converters in parallel whose outputs are combined in order to provide a higher power output. The total load current of a multi-phase DC-to-DC converter is shared amongst the component converter phases. Generally, the output current of each phase is measured and a control loop causes each phase to provide substantially the same output current.

A variety of current measurement schemes exist for measuring the output currents of DC-to-DC converters. These existing current measurement schemes have various drawbacks. For example, resistive sensing can be lossy. Direct current resistance (DCR) current sensing requires numerous external components and temperature compensation. Current sensing field effect transistors (SenseFETs) and other integrated schemes can be susceptible to process variation and struggle to maintain accuracy over wide current and temperature ranges.

SUMMARY

Illustrative aspects of the present disclosure are directed to a DC-to-DC power converter that includes a voltage input, a power stage, an output stage, and a ripple magnitude detector. The power stage includes a plurality of transistors and an energy transfer capacitor. A terminal of a first transistor of the plurality of transistors is coupled to the voltage input. A terminal of at least one of the transistors is coupled to a switch node. The energy transfer capacitor is coupled between at least two of the transistors. The output stage includes an inductor and an output capacitor. The inductor is coupled between the switch node and a voltage output. The output capacitor is coupled between the voltage output and ground. The ripple magnitude detector detects a magnitude of a change in voltage across the energy transfer capacitor and determines an amount of current though the inductor based on the magnitude of the change in voltage across the energy transfer capacitor.

Other illustrative aspects of the present disclosure are directed to a multi-phase DC-to-DC power converter that includes a plurality of DC-to-DC power converters and a current sharing controller. Each of the plurality of DC-to-DC power converters includes a voltage input, a power stage, an output stage, a gate controller, and a ripple magnitude detector. The power stage of each DC-to-DC power converter includes a plurality of power-stage transistors and an energy transfer capacitor. A terminal of a first transistor of the plurality of power-stage transistors is coupled to the voltage input. A terminal of at least one of said power-stage transistors is coupled to a switch node. The energy transfer capacitor is coupled between at least two of the power-stage transistors. The output stage of each DC-to-DC power converter includes an inductor and an output capacitor. The inductor is coupled between the switch node and a voltage output. The output capacitor is coupled between the voltage output and ground. The gate controller of each DC-to-DC power converter controls the output voltage of its associated DC-to-DC power converter by controlling the pulse width or the frequency of control signals provided to the power-stage transistors of the associated DC-to-DC power converter. The ripple magnitude detector of each DC-to-DC power converter detects a magnitude of a change in voltage across the energy transfer capacitor and generates a signal representative of the output current of the associated DC-to-DC power converter based on the magnitude of the change in voltage across the energy transfer capacitor. The current sharing controller receives from each DC-to-DC power converter the signals representative of the output current of each DC-to-DC power converter, and provides to the gate controller of each DC-to-DC power converter a signal representative of a target output current.

Other illustrative aspects of the present disclosure are directed to a method of operating a DC-to-DC power converter having a power stage that includes an energy transfer capacitor, and an output stage that includes an output inductor. Pursuant to said method, a voltage change across the energy transfer capacitor is measured, and an amount of current through the output inductor is determined based on the measured voltage change across the energy transfer capacitor.

BRIEF DESCRIPTION OF THE DRAWINGS

FIG. 4 is a two-part graph demonstrating the relationship between inductor current and energy transfer capacitor voltage for an illustrative series capacitor buck converter.

DETAILED DESCRIPTION

Illustrative aspects of the present disclosure are directed to techniques for measuring current in hybrid capacitor/ inductor converters. The techniques of this disclosure may be used for current sharing (e.g., load current sharing) as well as other functions such as, for example, light-load detection, overcurrent detection, etc.

Aspects of the present disclosure are applicable to substantially any type of hybrid capacitor/inductor DC-to-DC power converter, i.e., any DC-to-DC power converter that employs an energy transfer capacitor in the power stage of the converter, wherein the energy transfer capacitor is charged and discharged by the inductor in the output stage of the DC-to-DC converter. For purposes of illustration, aspects of this disclosure will be described with respect to two different buck converter topologies, namely a series capacitor buck converter and a three-level buck converter employing a flying capacitor.

Figure 1:
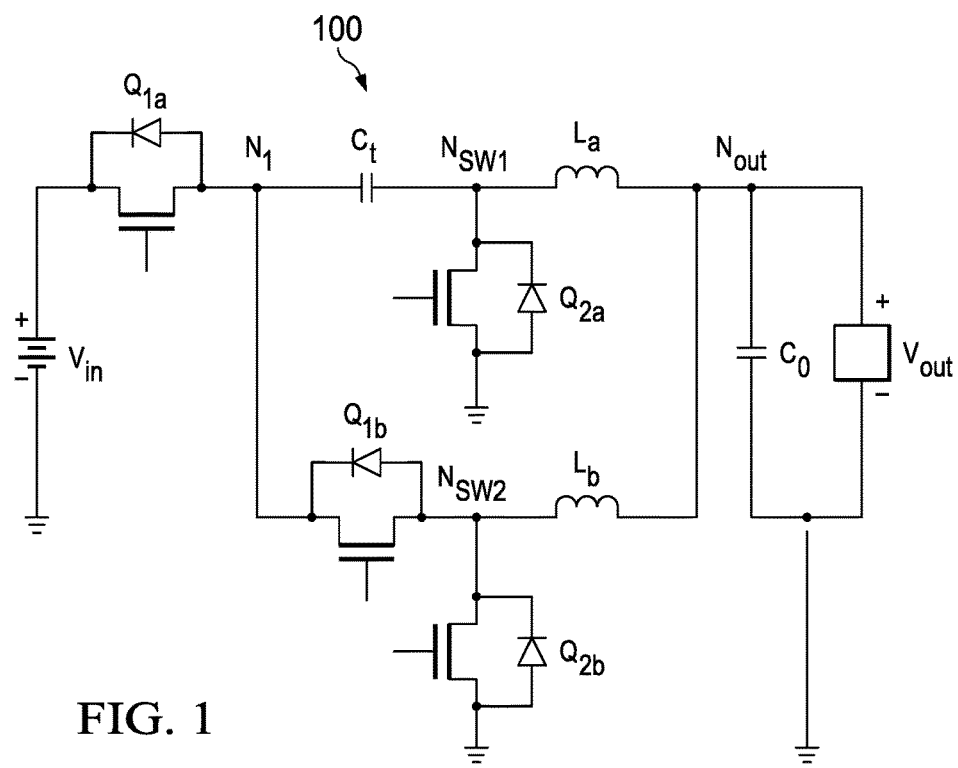
FIG. 1 is a schematic diagram of a series capacitor buck converter.

FIG. 1 is a schematic diagram of a series capacitor buck converter 100. The power stage of series capacitor buck converter 100 includes two complementary transistor pairs, and the series capacitor buck converter 100 can be thought of as a two-phase buck converter. High-side transistor $Q_{1a}$ and low-side transistor $Q_{2a}$, along with output inductor $L_a$, can be thought of as a first phase of the buck converter 100, which will sometimes be referred to herein as phase A. High-side transistor $Q_{1b}$ and low-side transistor $Q_{2b}$, along with output inductor $L_b$, can be thought of as a second phase of the buck converter 100, which will sometimes be referred to herein as phase B. Transistors $Q_{1a}$, $Q_{2a}$, $Q_{1b}$, and $Q_{2b}$ serve as switches. In the illustrative embodiment of FIG. 1, transistors $Q_{1a}$, $Q_{2a}$, $Q_{1b}$, and $Q_{2b}$ are n-channel metal-oxide-semiconductor field-effect transistors (MOSFETs), but the switches can be implemented using substantially any type of transistor. During operation of the series capacitor buck converter 100, the drain of transistor $Q_{1a}$ is coupled to an input voltage $V_{in}$, which is a DC voltage that is to be converted to another DC voltage by the series capacitor buck converter 100. The source of transistor $Q_{1a}$ is coupled to a node $N_1$. A series capacitor $C_t$ is coupled between node $N_1$ and a first switch node $N_{SW1}$. The series capacitor $C_t$ serves as an energy transfer capacitor in the buck converter 100. The drain of transistor $Q_{2a}$ is also coupled to switch node $N_{SW1}$ and the source of transistor $Q_{2a}$ is coupled to a ground node. The ground node may operate at a potential of ground or a potential that is different than or lower than the input voltage $V_{in}$.

The drain of transistor $Q_{1b}$ is coupled to node $N_1$ and the source of transistor $Q_{1b}$ is coupled to a second switch node $N_{SW2}$. The drain of transistor $Q_{2a}$ is also coupled to switch node $N_{SW2}$ and the source of transistor $Q_{2b}$ is coupled to a ground node.

In the output stage of the series capacitor buck converter 100, phase A output inductor $L_a$ is coupled between the switch node $N_{SW1}$ and output node $N_{out}$, and phase B output inductor $L_b$ is coupled between the switch node $N_{SW2}$ and output node $N_{out}$. An output capacitor $C_O$ is coupled between the output node $N_{out}$ and a ground node. The output node operates at an output voltage $V_{out}$, which is the DC voltage generated by the series capacitor buck converter 100.

The gates of transistors $Q_{1a}$, $Q_{2a}$, $Q_{1b}$, and $Q_{2b}$ are coupled to a gate controller (not shown) that generates gate voltages to turn the transistors $Q_{1a}$, $Q_{2a}$, $Q_{1b}$, and $Q_{2b}$ on and off. Accordingly, the gate controller serves as a switch controller to control the switching function of transistors $Q_{1a}$, $Q_{2a}$, $Q_{1b}$, and $Q_{2b}$. The two pairs of complementary switches, $(Q_{1a}, Q_{2a})$ and $(Q_{1b}, Q_{2b})$ are operated at the same duty cycle and phase shifted by 180°. Thus, the gate controller turns transistors $Q_{1a}$ and $Q_{2a}$ on and off, such that one transistor is on while the other transistor is off. The on and off periods control the current flowing through the inductor $L_a$. In discontinuous modes of operation, both transistor $Q_{1a}$ and transistor $Q_{2a}$ are turned off at the same time for a period. Similarly, the gate controller turns transistors $Q_{1b}$ and $Q_{2b}$ off and on, such that one transistor is on while the other transistor is off. The on and off periods of transistors $Q_{1b}$ and $Q_{2b}$ controls the current flowing through the inductor $L_b$. In discontinuous modes of operation, both transistor $Q_{1b}$ and transistor $Q_{2b}$ are turned off at the same time for a period. The combined currents through inductors $L_a$ and $L_b$ generate a voltage across the capacitor $C_O$, which is the output voltage $V_{OUT}$ of the series capacitor buck converter 100.

Thus, the series capacitor buck converter topology combines a switched capacitor (SC) circuit and a buck converter by adding the series capacitor $C_t$ to a conventional two-phase buck converter. The main differences between the series capacitor buck converter 100 and a conventional two-phase buck converter are that the duty ratio of the high-side switches $Q_{1a}$ and $Q_{1b}$ is doubled, switching occurs with half the drain-to-source voltage experienced by switches in a buck converter, inductor current balancing is inherent, and inductor current ripple is decreased.

One characteristic of this combined topology is soft charging and discharging of the series capacitor $C_t$. The inductors $L_a$ and $L_b$ act as current sources which softly charge and discharge the series capacitor $C_t$. Soft charging tends to reduce the large peaks of current that capacitors experience when hard charged from a voltage source in conventional switched capacitor (SC) circuits. Because the output inductors $L_a$ and $L_b$ act as current sources to charge/discharge the energy transfer capacitor $C_t$, the voltage ripple on the capacitor $C_t$ is proportional to the output inductor current.

Figure 2:
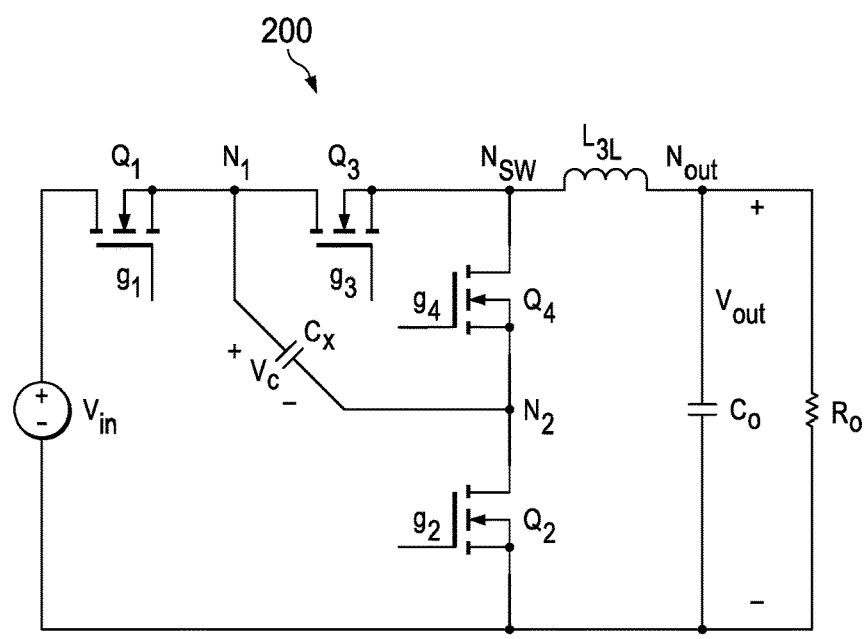
FIG. 2 is a schematic diagram of a three-level buck converter.

FIG. 2 is a schematic diagram of a three-level buck converter 200. The power stage of the three-level buck converter 200 includes two complementary transistor pairs. High-side transistor $Q_1$ and low-side transistor $Q_2$ make up a first complementary transistor pair. High-side transistor $Q_3$ and low-side transistor $Q_4$ make up a second complementary transistor pair. Transistors $Q_1$, $Q_2$, $Q_3$, and $Q_4$ serve as switches. In the illustrative embodiment of FIG. 2, transistors $Q_1$, $Q_2$, $Q_3$, and $Q_4$ are NMOS (n-channel metal-oxide-semiconductor field-effect) transistors, but the switches can be implemented using substantially any type of transistor. During operation of the three-level buck converter 200, the drain of transistor $Q_1$ is coupled to an input voltage $V_{in}$, which is a DC voltage that is to be converted to another DC voltage by the three-level buck converter 200. The source of transistor $Q_1$ is coupled to a node $N_1$. A capacitor $C_x$, commonly referred to as a flying capacitor, is coupled between node $N_1$ and a node $N_2$. The series capacitor $C_x$ serves as an energy transfer capacitor in the three-level buck converter 200. The drain of transistor $Q_2$ is also coupled to node $N_2$, and the source of transistor $Q_2$ is coupled to a ground node.

The drain of transistor $Q_3$ is coupled to node $N_1$ and the source of transistor $Q_3$ is coupled to a switch node $N_{SW}$. The drain of transistor $Q_4$ is also coupled to switch node $N_{SW}$ and the source of transistor $Q_4$ is coupled to node $N_2$.

In the output stage of the three-level buck converter 200, output inductor $L_{3L}$ is coupled between the switch node $N_{SW}$ and output node $N_{out}$. An output capacitor $C_O$ is coupled between the output node $N_{out}$ and a ground node. The output node $N_{out}$ operates at an output voltage $V_{out}$, which is the DC voltage generated by the three-level buck converter 200.

The gates of transistors $Q_1$, $Q_2$, $Q_3$, and $Q_4$ are coupled to a gate controller (not shown) that generates gate voltages to turn the transistors $Q_1$, $Q_2$, $Q_3$, and $Q_4$ on and off. Accordingly, the gate controller serves as a switch controller to control the switching function of transistors $Q_1$, $Q_2$, $Q_3$, and $Q_4$. The two pairs of complementary switches, ($Q_1$, $Q_2$) and ($Q_3$, $Q_4$) are operated at the same duty cycle and phase shifted by 180°, similar to the operation of the series capacitor buck converter of FIG. 1. Assuming that the flying capacitor $C_x$ is balanced such that the voltage $V_C$ across the flying capacitor $C_x$ equals $V_{in}/2$, the voltage $V_{SW}$ of the switch node $N_{SW}$ can take one of three possible levels: 0, $V_{in}/2$, or $V_{in}$. The current through inductor $L_{3L}$ generates a voltage across the capacitor $C_O$, which is the output voltage $V_{OUT}$ of the three-level buck converter 200. By phase shifting the switching of the two pairs of transistors, the frequency of the $V_{SW}$ pulses is $2f_s$, where $f_s$ is the switching frequency. The three-level operation, in combination with the effective doubling of the switching frequency, results in favorable trade-offs in terms of decreasing the switching ripples, decreasing the switching frequency, reducing the size of the filter elements, increasing the converter open-loop bandwidth, and/or increasing the converter efficiency.

Similar to the series capacitor buck converter 100 of FIG. 1, the inductors $L_{3L}$ acts as current source which soft charges and discharges the flying capacitor Cx. Thus, the voltage ripple on the capacitor $C_x$ is proportional to the output inductor current.

Figure 3:
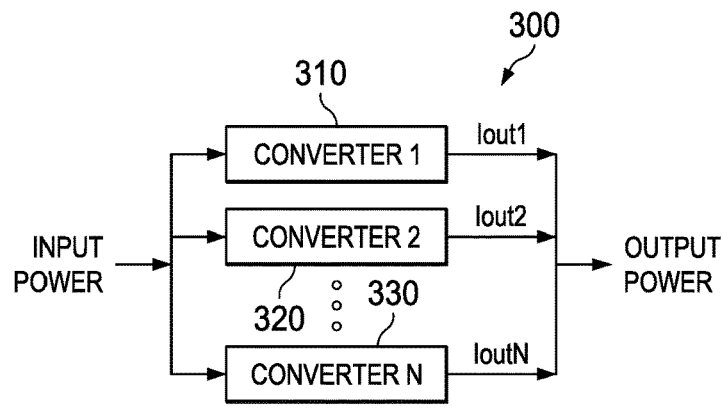
FIG. 3 is a block diagram representing a multi-phase DC-to-DC power converter.

FIG. 3 is a block diagram representing a multi-phase DC-to-DC power converter 300. Multi-phase converter 300 includes multiple DC-to-DC converters 310, 320, 330 arranged in parallel. Each DC-to-DC converter 310, 320, 330 is an individual DC-to-DC converter, such as the illustrative DC-to-DC converters shown in FIGS. 1 and 2. Such a multi-phase DC-to-DC converter can include any number N of individual converters arranged in parallel. Illustratively, all of the individual converters 310, 320, 330 receive the same input voltage signal, and convert the input voltage to another (often lower) voltage. The individual DC-to-DC converters 310, 320, 330 all target the same output voltage. Combining the individual converters 310, 320, 330 into a single multiphase converter 300 allows the multiphase converter 300 to produce a higher-power output signal since the load current of the multi-phase converter 300 is shared amongst the individual converter phases 310, 320, 330. Also, by parallel coupling multiple DC-to-DC converters, a relatively high control bandwidth can be achieved.

It is generally desirable that the overall load current be shared substantially equally among the individual DC-to-DC converters 310, 320, 330. This sharing helps to ensure efficient operation and to evenly distribute the thermal dissipation due to power loss. In order to effect the equal sharing of load current amongst the individual DC-to-DC converter phases 310, 320, 330, it is necessary to track the output current of each DC-to-DC converter in the multi-phase converter 300.

As previously mentioned, during the operation of a hybrid capacitor/inductor DC-to-DC power converter, the output inductor(s) act as a current source to charge and discharge the converter's energy transfer capacitor. For example, in the series capacitor buck converter of FIG. 1, the output inductors $L_a$ and $L_b$ act to charge/discharge the series capacitor $C_t$. Similarly, in the three-level buck converter of FIG. 2, the output inductor $L_{3L}$ charges and discharges the flying capacitor $C_x$. The resulting change in the voltage across the energy transfer capacitor, sometimes referred to as the voltage ripple, is proportional to the current through the output inductor(s). The output inductor current is equal to the load current produced by the individual DC-to-DC converter phase (in steady state conditions). Aspects of the present disclosure take advantage of this fact and use the magnitude of the voltage ripple in the energy transfer capacitor to determine the output current of the DC-to-DC converter. When the output current is relatively higher, the magnitude of the voltage ripple on the energy transfer capacitor will be relatively higher, and when the output current is relatively lower, the magnitude of the voltage ripple on the energy transfer capacitor will be relatively lower.

FIG. 4 is a two-part graph demonstrating this relationship between inductor current and energy transfer capacitor voltage for an illustrative series capacitor buck converter such as the series capacitor buck converter of FIG. 1. The top portion 400 of FIG. 4 plots an illustrative voltage across a series capacitor such as the series capacitor $C_t$ of FIG. 1. The bottom portion 410 plots illustrative corresponding currents through the series capacitor $C_t$, inductor $L_a$ and inductor $L_b$. The horizontal axes of both the top 400 and bottom 410 portions of FIG. 4 represent time, and are both on the same scale to demonstrate the relationship of the plotted currents and the series capacitor voltage.

The series capacitor $C_t$ of FIG. 1 acts as a DC voltage source with approximately half the input voltage $V_{in}$ across it. During time period $T_1$ of FIG. 4, high-side transistor $Q_{1a}$ is on, and the series capacitor $C_t$ is charged by phase A inductor current. During time period $T_2$, both high-side transistors $Q_{1a}$ and $Q_{1b}$ are off, and the series capacitor voltage remains constant. During time period $T_3$, high-side transistor $Q_{1b}$ is on, and the series capacitor $C_t$ is discharged by phase B inductor current. During time period $T_4$, both high-side transistors and $Q_{1b}$ are off, and the series capacitor voltage remains constant. The fluctuation in the series capacitor voltage is referred to as the voltage ripple. The magnitude of the voltage ripple is proportional to the magnitude of the current through the output inductors $L_a$ and $L_b$.

Figure 5:
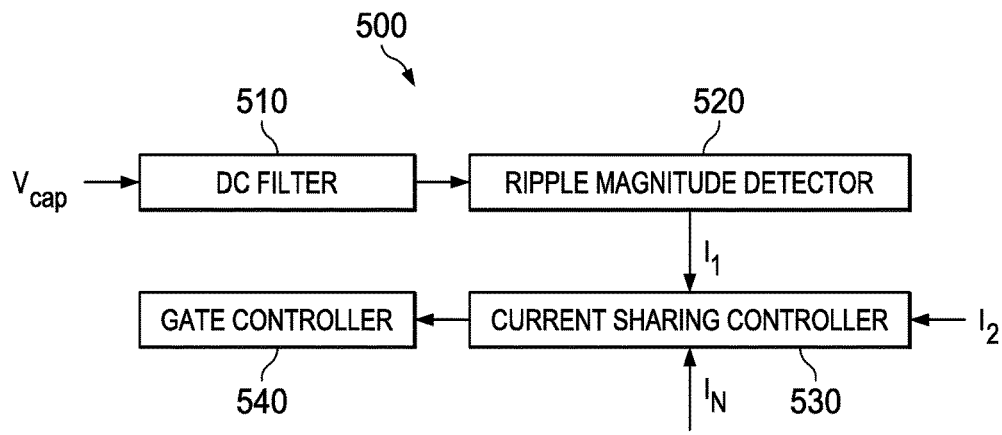
FIG. 5 is a block diagram representing a current sharing control circuit for a hybrid capacitor/inductor DC-to-DC power converter that is part of a multi-phase DC-to-DC power converter.

FIG. 5 is a block diagram representing a current sharing control circuit for a hybrid capacitor/inductor DC-to-DC power converter, such as DC-to-DC power converter 310, that is part of a multi-phase DC-to-DC power converter, such as multi-phase DC-to-DC power converter 300. In illustrative embodiments, the differential voltage $V_{cap}$ of an energy transfer capacitor of the DC-to-DC converter 300 is provided to a DC filter 510, which removes a DC component from the voltage signal. For example, looking at FIG. 4, it can be seen that the voltage across the series capacitor $C_t$ of FIG. 1 fluctuates around a level of approximately 6 volts. But the information that is pertinent to the ripple detection is the amount of fluctuation in the voltage signal. Thus the DC filter 510 removes the DC component of the signal using a high-pass filter or a bandpass filter.

The DC-filtered signal is provided to a ripple magnitude detector 520, which determines the magnitude of the change, or variation, in the capacitor voltage. For example, looking at FIG. 4, the capacitor voltage fluctuates from approximately 5.96 volts to approximately 6.10 volts. Thus the ripple magnitude is approximately 0.14 volts. Based on the measured amount of voltage ripple, the ripple magnitude detector 520 generates an estimate of the amount of current through the output inductor (i.e., the output current), which, as previously explained, is proportional to the magnitude of the voltage ripple.

The ripple magnitude detector provides the output current estimate to a current sharing controller 530, which similarly receives output currents (shown as $I_2$ and $I_N$ in FIG. 5) from the other DC-to-DC converters 320, 330 of the multi-phase DC-to-DC converter 300. The current sharing controller 530 compares the output current magnitudes of the various phases and determines a target output current for each of the component DC-to-DC converters 310, 320, 330 of the multi-phase DC-to-DC converter 300. In an illustrative embodiment, the current sharing controller 530 endeavors to achieve equal load current sharing and therefore generates equal output current targets for all of the DC-to-DC converters 310, 320, 330 of the multi-phase converter 300. In an illustrative embodiment, there is a single current sharing controller 530 for the multi-phase converter 300 which generates target output currents for each of the component converters 310, 320, 330 in the multi-phase converter 300. In an alternative embodiment, each individual power converter 310, 320, 330 has its own current sharing controller 530. Also, in an alternative embodiment, the ripple magnitude detector 520 provides the detected ripple magnitude directly to the current sharing controller 530, rather than providing an output current estimate based on said ripple magnitude. In such an embodiment, the current sharing controller 530 generates output current targets based on the ripple magnitudes, as opposed to output current estimates provided by the component ripple magnitude detectors.

The current sharing controller 530 provides the output current target for each individual DC-to-DC power converter 310, 320, 330 to the gate controller 540 of that DC-to-DC power converter. The gate controller 540 modulates the pulse width (duty cycle) or the frequency of the gate control signals provided to its power stage transistors (such as transistors $Q_{1a}$, $Q_{2a}$, $Q_{1b}$, and $Q_{2b}$ of FIG. 1, e.g.) based at least in part on the target output current received from the current sharing controller 530. Illustratively, the gate controller 540 also bases its pulse-width determinations on additional factors as well, such as the target output voltage of the power converter.

Figure 6:
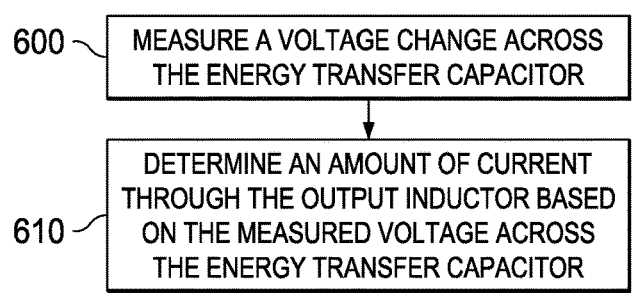
FIG. 6 is a flowchart representing a method of operating a DC-to-DC power converter comprising a power stage that includes an energy transfer capacitor, and an output stage that includes an output inductor.

FIG. 6 is a flowchart representing a method of operating a DC-to-DC power converter comprising a power stage that includes an energy transfer capacitor, and an output stage that includes an output inductor. At step 600, a voltage change across the energy transfer capacitor is measured. At step 610, an amount of current through the output inductor is determined based on the measured voltage change across the energy transfer capacitor.

The output current measuring techniques of the present disclosure offer numerous advantages over existing output current measurement techniques. In some implementations, the described techniques require no, or very few, additional external components. Additionally, in contrast to many existing techniques, determining converter output current based on the voltage ripple magnitude of an energy transfer capacitor is lossless and robust.

While some examples of determining output current of a DC-to-DC power converter based on the magnitude of the voltage ripple of an energy transfer capacitor have been described in detail herein, it is to be understood that the inventive concepts may be otherwise variously embodied and employed and that the appended claims are intended to be construed to include such variations except insofar as limited by the prior art.

What is claimed is:

1. A DC-to-DC power converter comprising:
   a voltage input;
   a power stage comprising:
      a plurality of transistors, a terminal of a first transistor of said plurality of transistors being coupled to the voltage input, a terminal of at least one of said transistors being coupled to a switch node; and
      an energy transfer capacitor coupled between at least two of said transistors;
   an output stage comprising:
      an inductor coupled between said switch node and a voltage output; and
      an output capacitor coupled between said voltage output and ground;
   a ripple magnitude detector operable to detect a magnitude of a change in voltage across the energy transfer capacitor and operable to determine an amount of current though the inductor based on said magnitude of the change in voltage across the energy transfer capacitor;
   a voltage measurement circuit operable to measure the voltage across the energy transfer capacitor; and
   a filter operable to remove a DC component from the measured voltage and to provide a signal representative of the DC-filtered voltage to the ripple magnitude detector.

2. The DC-to-DC power converter of claim 1 wherein the energy transfer capacitor is operable to be charged and discharged by the inductor.

3. The DC-to-DC power converter of claim 1 wherein said DC-to-DC power converter comprises a three-level buck converter and wherein the energy transfer capacitor comprises a flying capacitor.

4. The DC-to-DC power converter of claim 3 wherein said first transistor constitutes a first high-side transistor and comprises a first terminal coupled to the voltage input and a second terminal coupled to a first node, wherein the flying capacitor is coupled between said first node and a second node, and wherein the plurality of transistors further comprises:
   a second high-side transistor comprising a first terminal coupled to said first node and a second terminal coupled to said switch node;
   a first low-side transistor comprising a first terminal coupled to said switch node and a second terminal coupled to said second node; and
   a second low-side transistor comprising a first terminal coupled to said second node and a second terminal coupled to ground.

5. A DC-to-DC power converter comprising:
   a voltage input;
   a power stage comprising:
      a plurality of transistors, a terminal of a first transistor of said plurality of transistors being coupled to the voltage input, a terminal of at least one of said transistors being coupled to a switch node; and
      an energy transfer capacitor coupled between at least two of said transistors;
   an output stage comprising:
      an inductor coupled between said switch node and a voltage output; and
      an output capacitor coupled between said voltage output and ground;
   a ripple magnitude detector operable to detect a magnitude of a change in voltage across the energy transfer capacitor and operable to determine an amount of current though the inductor based on said magnitude of the change in voltage across the energy transfer capacitor; and
   a buck converter, the energy transfer capacitor comprising a series capacitor.

6. The DC-to-DC power converter of claim 5 wherein said first transistor constitutes a first high-side transistor and comprises a first terminal coupled to the voltage input and a second terminal coupled to a first node, wherein the series capacitor is coupled between said first node and a first switch node, and wherein the plurality of transistors further comprises:
   a second high-side transistor comprising a first terminal coupled to said first node and a second terminal coupled to a second switch node;
   a first low-side transistor comprising a first terminal coupled to said first switch node and a second terminal coupled to ground; and
   a second low-side transistor comprising a first terminal coupled to said second switch node and a second terminal coupled to ground.

7. The DC-to-DC power converter of claim 6 wherein said inductor constitutes a first inductor and is coupled between said first switch node and the voltage output, and wherein the output stage further comprises a second inductor coupled between said second switch node and the voltage output.

8. The DC-to-DC power converter of claim 5 wherein the energy transfer capacitor is operable to be charged and discharged by the inductor.

9. The DC-to-DC power converter of claim 5 wherein said DC-to-DC power converter comprises a three-level buck converter and wherein the energy transfer capacitor comprises a flying capacitor.

10. The DC-to-DC power converter of claim 9 wherein said first transistor constitutes a first high-side transistor and comprises a first terminal coupled to the voltage input and a second terminal coupled to a first node, wherein the flying capacitor is coupled between said first node and a second node, and wherein the plurality of transistors further comprises:
    a second high-side transistor comprising a first terminal coupled to said first node and a second terminal coupled to said switch node;
    a first low-side transistor comprising a first terminal coupled to said switch node and a second terminal coupled to said second node; and
    a second low-side transistor comprising a first terminal coupled to said second node and a second terminal coupled to ground.

11. A multi-phase DC-to-DC power converter comprising:
    a plurality of DC-to-DC power converters, each comprising:
        a voltage input;
        a power stage comprising:
            a plurality of power-stage transistors, a terminal of a first transistor of said plurality of power-stage transistors being coupled to the voltage input, a terminal of at least one of said power-stage transistors being coupled to a switch node; and
            an energy transfer capacitor coupled between at least two of said power-stage transistors;
        an output stage comprising:
            an inductor coupled between said switch node and a voltage output; and
            an output capacitor coupled between said voltage output and ground;
        a gate controller operable to control the output voltage of its associated DC-to-DC power converter by controlling at least one parameter of control signals provided to the power-stage transistors of the associated DC-to-DC power converter; and
        a ripple magnitude detector operable to detect a magnitude of a change in voltage across the energy transfer capacitor and operable to generate a signal representative of the output current of the associated DC-to-DC power converter based on said magnitude of the change in voltage across the energy transfer capacitor; and
    a current sharing controller operable to receive from each DC-to-DC power converter the signals representative of the output current of each DC-to-DC power converter, and to provide to the gate controller of each DC-to-DC power converter a signal representative of a target output current;
    the plurality of DC-to-DC power converters comprising a plurality of buck converters, and the energy transfer capacitors comprising series capacitors.

12. The multi-phase DC-to-DC power converter of claim 11 wherein the current sharing controller is operable to control the gate controller of each DC-to-DC converter such that each DC-to-DC converter generates substantially equal amounts of output current.

13. The multi-phase DC-to-DC power converter of claim 11 wherein the energy transfer capacitors are operable to be charged and discharged by the inductors of their respective output stages.

14. The DC-to-DC power converter of claim 11 wherein said first transistor of each buck converter constitutes a first high-side transistor and comprises a first terminal coupled to the voltage input and a second terminal coupled to a first node, wherein the series capacitor of each buck converter is coupled between said first node and a first switch node, and wherein the plurality of power-stage transistors of each buck converter further comprises:
    a second high-side transistor comprising a first terminal coupled to said first node and a second terminal coupled to a second switch node;
    a first low-side transistor comprising a first terminal coupled to said first switch node and a second terminal coupled to ground; and
    a second low-side transistor comprising a first terminal coupled to said second switch node and a second terminal coupled to ground.

15. The DC-to-DC power converter of claim 14 wherein said inductor of each buck converter constitutes a first inductor and is coupled between said first switch node and the voltage output, and wherein the output stage of each buck converter further comprises a second inductor coupled between said second switch node and the voltage output.

16. The DC-to-DC power converter of claim 11 wherein the plurality of DC-to-DC power converters comprise a plurality of three-level buck converters and wherein the energy transfer capacitors comprise flying capacitors.

17. The DC-to-DC power converter of claim 16 wherein said first transistor of each three-level buck converter constitutes a first high-side transistor and comprises a first terminal coupled to the voltage input and a second terminal coupled to a first node, wherein the flying capacitor of each three-level buck converter is coupled between said first node and a second node, and wherein the plurality of power-stage transistors of each three-level buck converter further comprises:
    a second high-side transistor comprising a first terminal coupled to said first node and a second terminal coupled to said switch node;
    a first low-side transistor comprising a first terminal coupled to said switch node and a second terminal coupled to said second node; and a second low-side transistor comprising a first terminal coupled to said second node and a second terminal coupled to ground.

18. The multi-phase DC-to-DC power converter of claim 11 wherein the current sharing controller is operable to compare the signals representative of the output current of each DC-to-DC power converter, and to generate the signals representative of the target output currents of the plurality of DC-to-DC power converters based on said comparison.

19. A method of operating a DC-to-DC power converter comprising a power stage that includes an energy transfer capacitor, and an output stage that includes an output inductor, the method comprising:

measuring a voltage change across the energy transfer capacitor, the measuring comprising: measuring the voltage across the energy transfer capacitor over a period of time; removing a DC component of the measured voltage; and determining the voltage change across the energy transfer capacitor; and determining an amount of current through the output inductor based on the measured voltage change across the energy transfer capacitor.

20. The method of operating the DC-to-DC power converter of claim 19 wherein the energy transfer capacitor is operable to be charged and discharged by the inductor.

* * * * *